United States Patent [19]
Montone

[11] 3,834,819
[45] Sept. 10, 1974

[54] THICKNESS MEASURING

[75] Inventor: Liber J. Montone, Reading, Pa.

[73] Assignee: Western Electric Company, Incorporated, New York, N.Y.

[22] Filed: July 5, 1973

[21] Appl. No.: 376,640

[52] U.S. Cl.................. 356/156, 178/6, 250/222
[51] Int. Cl........................ H04n 7/02, G01b 9/04
[58] Field of Search............ 356/156, 167; 250/222; 178/6

[56] References Cited
UNITED STATES PATENTS
3,187,185  6/1965  Milnes.................. 250/222
3,679,820  7/1972  Montone................ 178/6

Primary Examiner—Ronald L. Wibert
Assistant Examiner—Richard A. Rosenberger
Attorney, Agent, or Firm—G. W. Houseweart; A. Stapler

[57] ABSTRACT

The thickness of an object is measured with great accuracy by scanning with a television camera a light-section microscope image of the object and its support, electronically generating markers which extend at least partially into the televised images of support and object, respectively, and determining the difference in the number of scanning lines by which the respective markers so extend into the image. This difference represents the object thickness.

15 Claims, 3 Drawing Figures

THICKNESS MEASURING

BACKGROUND OF THE INVENTION

1. Field of the Invention This invention relates to methods and apparatus which make it possible to readily, and preferably automatically, measure the thickness of objects with extreme accuracy.

There are many situations in which such extreme accuracy in measuring the thickness of an object is desired. Some of these arise in the processing of beam-leaded semiconductor chips. The beam leads of such chips are typically very thin, e.g., only between about 10 and 20 micrometers in thickness. Yet this thickness must be accurately controlled, for such purposes as successfully performing automatic thermocompression bonding of the beam leads to substrates, and so forth.

Typical tolerances on beam lead thickness are ± 3 micrometers, with respect to a nominal thickness of 15 micrometers.

Moreover such tolerances should be maintained not only for the average thickness of the beam lead, but at every point across its entire width.

It is to this type of situation that the present invention particularly relates.

2. Description of the Prior Art

Various techniques have been proposed for accurately measuring such thicknesses. Ordinary mechanical gauging techniques are generally inadequate to this task because of the small dimensions involved and, more particularly, because of the miniscule departures from the nominal dimensions which must be ascertained.

To improve the accuracy, so-called light-section microscopes have been employed. A light-section microscope works as follows. The object whose thickness is to be measured, e.g., a beam lead of a semiconductor chip, is placed on a flat support. A strip of light is projected, in such a way that it falls partly across the top of the beam lead and partly beyond it onto the support. This light strip is observed with a microscope, from a direction which differs from the direction of light projection, as measured in a plane perpendicular to the light strip. The parallax effect arising from this difference between the directions of projection and observation causes the portion of the light strip falling on the beam lead to appear displaced, relative to the portion of the light strip falling on the support itself. The amount of the displacement so observed is a function of the thickness of the beam lead. This displacement can then be interpreted in terms of the thickness of the beam lead. Unfortunately, the dimensions which are involved are so small, that human judgement is not sufficiently reliable to interpret the observations so made.

It has been attempted to further improve on this technique by substituting, for the human microscope observer, a closed circuit television camera, by means of which a greatly enlarged image of the light strip under observation is reproduced on a television monitor screen. Even such electronically aided observation has proved inadequate because of the difficulty of visually determining the boundaries of the image on the television screen.

SUMMARY OF THE INVENTION

Accordingly, it is an object of the invention to provide a technique for measuring object thickness with improved accuracy.

It is another object to measure object thickness without depending on human judgment.

It is still another object to measure object thickness with an accuracy which is greater than that provided by a light-section microscope aided by electronic image magnification.

It is still another object to provide a technique for accurately measuring the thickness of an object at different points across the width of the object.

These, and still other objects which will appear, are achieved in accordance with the present invention as follows.

A television camera is used, in conjunction with a light-section microscope, to produce video signals which represent the line-by-line scanning of the light strip projected by the light-section microscope, both where it falls on the object whose thickness is to be measured, and where it falls on the object support. An image of this light strip is produced by these camera signals on a television monitor screen.

In addition, there are produced auxiliary signals which represent position markers for said light strip image. These markers are also displayed on the television monitor screen. The marker signals are so controlled relative to the light strip signals that the markers extend partly into the light strip image. One marker is lined up with the image portion derived from the support, while the other marker is lined up with the image portion derived from the object being measured.

The amount of overlap between each marker and that portion of the light strip image into which it partly extends is electronically measured, and the difference between these amounts is determined. This difference represents the thickness of the object.

Preferably, the vertical heights and positions of both markers on the monitor screen are adjustable in unison, while their widths and horizontal positions are adjustable independently.

By horizontally displacing the marker which extends into the portion of the light strip image derived from the object itself, the thickness of that object can be determined at various points along its width.

BRIEF DESCRIPTION OF THE DRAWINGS

For further details, reference may be had to the description which follows, in the light of the accompanying drawings, wherein.

The same reference numerals designate similar elements in the different figures.

DETAILED DESCRIPTION

Figure 1:
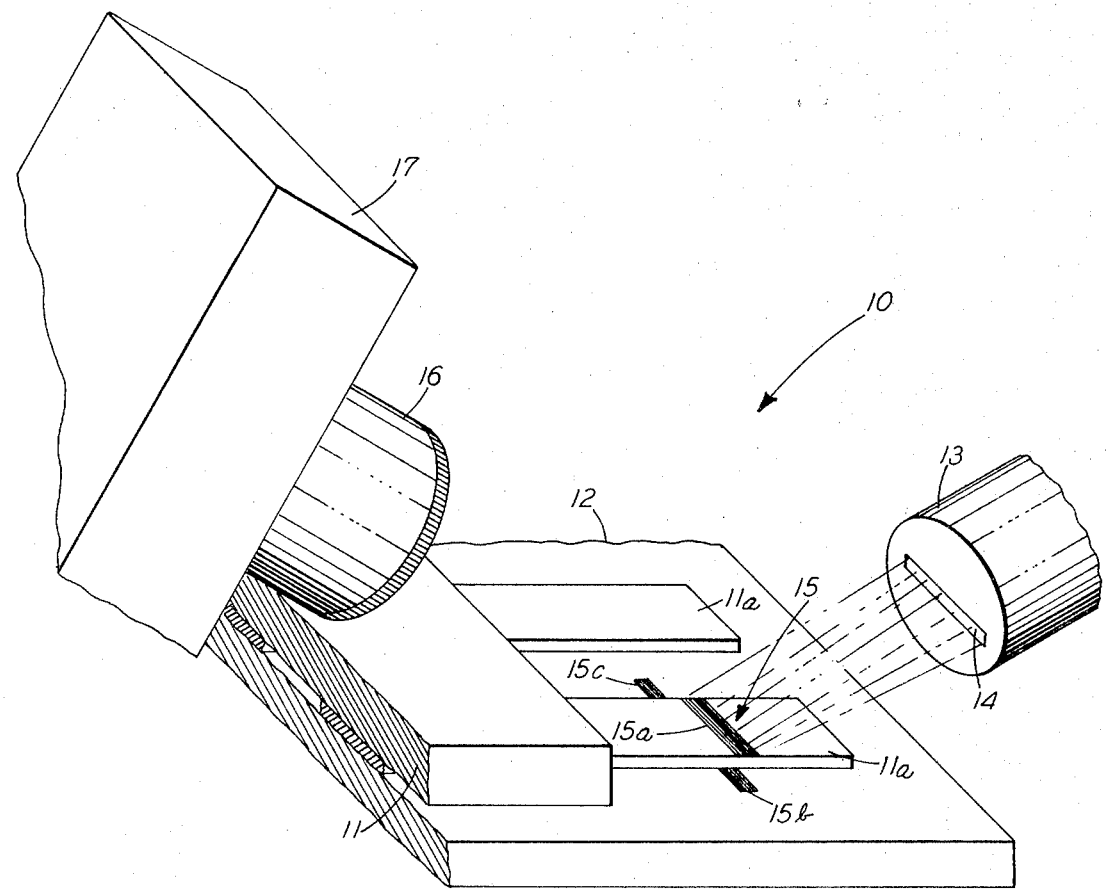
FIG. 1 is a simplified, diagrammatic illustration of a light-section microscope which forms part of the invention.
Figure 2:
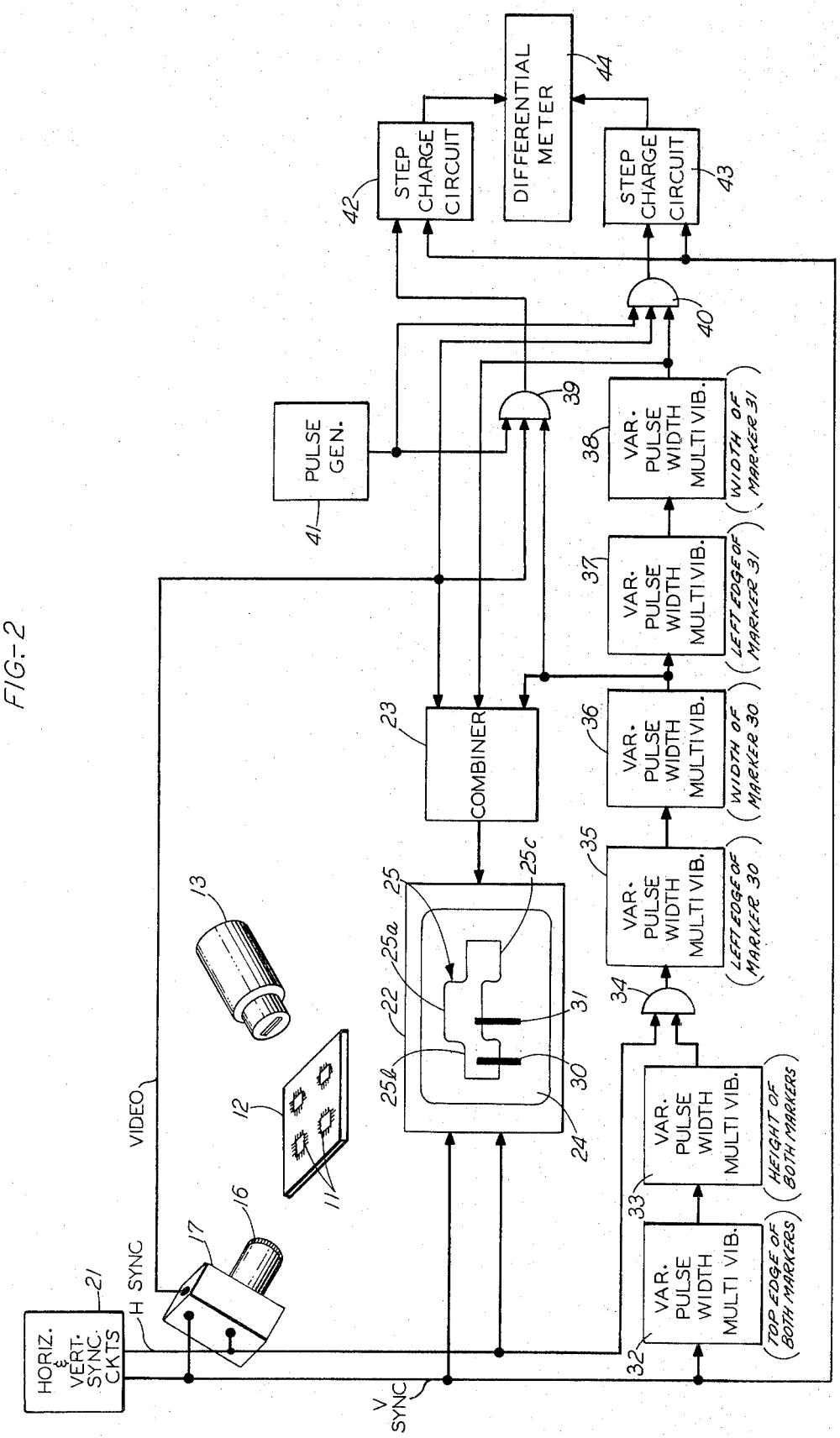
FIG. 2 shows, partly in block diagram form, an embodiment of the over-all system constituting the invention.

Both FIGS. 1 and 2, to which reference may now be had, show a light-section microscope generally designated by reference numeral 10, used in the thickness measurement of beam-leaded microcircuit chips 11.

In FIG. 2, four such chips 11 have been diagrammatically illustrated, all resting on a common support 12. It will be understood that, in practice, various numbers of such chips may be present on the support. However, typically only one beam lead at a time is measured. How light-section microscope 10 is involved in such measurement is particularly apparent from FIG. 1, which shows an enlarged view of a fragment of support 12, and one of chips 11, with two of its beam leads 11a. Light-section microscope 10 includes a light source 13 provided with a slit 14, through which a light strip 15 is projected toward support 12, from a direction which is preferably not perpendicular to the surface support 12, but rather is slanting relative to that surface, as measured in a plane perpendicular to light strip 15. As shown in FIG. 1, the one beam lead 11a whose thickness is to be measured is positioned with respect to light strip 15 so that a center portion 15a of the light strip falls across the top of this beam lead, while end portions 15b and 15c of the light strip extend beyond the edges of the beam lead and fall on support 12.

These end portions 15b and 15c are parallel to the center portions 15a of light strip 15. However, due to the slanting direction of light projection, these end portions are displaced from center portion 15a in a plane parallel to support 12. The amount of this displacement varies in proportion to the thickness of beam lead 11a.

A microscope lens system 16, which constitutes the optics of a television camera 17, is positioned to observe light strip 15 from a direction different from the direction of projection of light strip 15. Preferably, this direction of observation is also not perpendicular to the surface of support 12, but is slanting, at the angle of reflection which corresponds to the angle of incidence of the light projected from source 13.

The resultant image of light strip 15 which television camera 17 receives has a center portion (corresponding to light strip portion 15a) which is transversely displaced from the end portions (which correspond to light strip portions 15b and 15c). The amount of this dispacement is again determined by the thickness of beam lead 11a.

By performing both the projection and observation in slanting directions, the displacement of the center portion of the image is accentuated. By performing the observation at the angle of reflection, the amount of light reaching camera 17 from light strip 15 tends to be maximized.

As appears from FIG. 2, camera 17 scans the image so formed under the control of conventional vertical and horizontal synchronizing circuits 21. The scanning directions are such that the scanning lines parallel the length of light strip 15. A conventional television monitor 22 is supplied via combining circuit 23 with video signals from camera 17, together with other signals, as more fully explained hereinafter.

Monitor 22 has a display screen 24 upon which there is produced an image 25 of light strip 15, as scanned by camera 17. Image 25 includes a center portion 25a, flanked by left and right end portions 25b and 25c, displaced vertically from the center portion. These three portions of image 25 correspond, respectively, to the center and end portions of light strip 15 shown in FIG. 1. The amount of vertical displacement of end portions 25b and 25c from center portion 25a, corresponds to the thickness of beam lead 11a in FIG. 1.

Also displayed on screen 24 in FIG. 2 are markers 30 and 31. How these markers are generated and used will now be explained.

First, with respect to marker 30, the vertical synchronizing signals from circuits 21 are supplied to a first multivibrator circuit 32. This circuit 32 is of the type that produces a single pulse of controllable width in response to each vertical synchronizing pulse. The output signal from multivibrator 32 is supplied to a second multivibrator 33, which is also of the type producing a single pulse of controllable width in response to the input signal. In particular, multivibrator 33 produces such a pulse in response to the trailing edge of the pulse from multivibrator 32. Thus multivibrator 33 produces an output pulse of predetermined width, at the end of an interval following the occurrence of each vertical synchronizing pulse whose duration is determined by the width of the output pulse from multivibrator 32. If this output pulse from multivibrator 33 were applied directly to monitor 22, it would produce a horizontal band within the over-all screen scanning pattern of monitor 22. The position of the upper edge of that band, relative to the top of screen 24, would be determined by the width of the output pulse from multivibrator 32. The height of the band would be determined by the width of the pulse from multivibrator 33.

In fact, the output signal from multivibrator 33 is not applied to monitor 22, but is further processed as follows. It is supplied to one input of an AND gate 34, whose other input is supplied with horizontal synchronizing signals from circuits 21.

AND gate 34 responds in conventional manner to produce output pulses during coincidence between the horizontal synchronizing pulses and the output pulses from multivibrator 33. The output pulses from AND gate 34 are supplied to a third multivibrator 35, which responds to each pulse to produce an output pulse of controllable width, supplied, in turn, to a fourth multivibrator 36, which responds to the trailing edge of each multivibrator 35 output pulse to produce in turn a pulse of controllable width. Thus, a series of output pulses from multivibrator 36 occur within the time interval defined by each output pulse from multivibrator 33. Each pulse of the series occurs at the same time position within the successive horizontal line scannings that take place during said interval. Therefore, if the output signals from multivibrator 36 were applied to monitor 22, they would produce on its screen 24 a pattern having the same height as the horizontal band previously mentioned (in connection with multivibrator 33), a left edge whose position is defined by the width of the pulse from multivibrator 35, and a horizontal width which is defined by the width of the pulse from multivibrator 36. These output signals from multivibrator 36, are, in fact, applied to monitor 22, via combining circuit 23. The pattern which they produce on screen 24 constitutes marker 30 in FIG. 2.

Now, as to marker 31, it is produced by supplying the output signal from multivibrator 36 to a fifth multivibrator 37, whose output pulses are, in turn supplied to a sixth multivibrator 38. Each of multivibrators 37 and 38 also produces a single output pulse of controllable width in response to each input pulse. More particularly, multivibrator 38 produces such a pulse in response to each trailing edge of of the output signal from multivibrator 37. Therefore, multivibrators 37 and 38 cooperate to produce at the output of multivibrator 38 pulses which occur later than the pulses from multivibrator 36, during each horizontal line scanning of the horizontal band previously mentioned (in discussing the output signal from multivibrator 33). The output signals from multivibrator 38 are also supplied via combiner 23 to monitor 22 and produce on its screen 24 the pattern constituting marker 31. Marker 31 is positioned on screen 24 farther to the right than marker 30.

The signals producing markers 30 and 31 are preferably applied to monitor 22 with polarities opposite to the polarity with which the camera video signal is applied. For example, the camera video signal may be applied with such polarity that image 25 forms a bright pattern on screen 24. The marker signals are then applied with such polarities as to form dark marker images. Thus the markers are readily distinguishable from the light strip image. If necessary, polarity inverting circuits can be interposed in appropriate ones of the signal paths to produce signals of the proper relative polarities.

Combiner 23 may be any conventional circuit which provides additive combination of the signals supplied thereto. Application of its output signal to monitor 22 may take place in conventional manner as, for example, by supplying that output signal to the conventional video circuitry forming part of such a monitor.

In addition to being supplied to monitor 22, as previously described, the output signals from multivibrators 36 and 38, representing markers 30 and 31 respectively, are also supplied to two conventional AND gates 39 and 40. To another input of each gate, there is supplied the video signal from camera 17, and to a third input of each AND gate, there is supplied a train of pulses from pulse generator 41.

AND gate 39 transmits pulses from pulse generator 41 only when both the camera video signal and the signal representing marker 30 are also simultaneously present. This occurs only during coincidence between image 25 and marker 30. Pulse generator 41 preferably operates at such a frequency that a plurality of pulses from pulse generator 41 are transmitted by AND gate 39 each time it opens. The total number of such pulses transmitted during each scanning of monitor 22 is therefore a function of the distance by which marker 30 extends into light strip image 25.

Similarly, AND gate 40 transmits pulses from generator 41 only during coincidence between image 25 and marker 31. Again the number of pulses so transmitted during each field scanning of monitor 22 is a function of the distance by which marker 31 extends into light strip image 25. It will be recalled that the top edges of both markers 30 and 31 are controlled by adjustment of multivibrator 32, the vertical heights of both are set by multivibrator 33, the left edges of the markers are independently controlled by multivibrators 35 and 37, respectively, and their horizontal widths are independently controlled by multivibrators 36 and 38, respectively.

In accordance with the invention, the various multivibrators of FIG. 2 are so adjusted as to their individual output pulse widths that marker 30 extends into end portion 25b of light strip image 25, while marker 31 extends into the center portion 25a of image 25.

Since the vertical dimension of markers 30 and 31 are the same, the difference in the distances by which they extend into light strip image 25 is attributable to vertical displacements of the different portions of that image.

Such vertical displacements within image 25 are the result of the operation of light-section microscope 10 in response to the thickness of beam lead 11a which is undergoing measurement.

The difference between the distances by which markers 30 and 31 extend into light strip portions 25a and 25b therefore represents the thickness of the beam lead.

This difference is electronically measured as follows.

The output signals from AND gates 39 and 40 are supplied, respectively, to step charge circuits 42 and 43.

The pulses reaching each step charge circuit from its respective AND gate produce an accumulation of charge and therefore a voltage proportional to their number. At the end of each field scanning of the monitor screen, the step charge circuits are reset to the state in which they were before any pulses were applied, through application of a vertical synchronizing pulse from circuitry 21.

Thus, during each field scanning, there will be developed in step charge circuit 42 a voltage proportional to the distance by which marker 30 extends into image portion 25b. In step charge circuit 43, on the other hand, there will be developed a voltage proportional to the distance by which marker 31 extends into image portion 25a.

The voltage thus developed in the respective step charge circuits 42 and 43 are supplied to a differential meter 44 which produces a reading indicating the difference between these voltages. This reading therefore represents the difference between the distances by which markers 30 and 31 extend into their respective portions of image 25 on monitor screen 24. Thus, meter reading represents the thickness of beam lead 11a and, indeed, meter 44 can be calibrated in units of such thickness.

By varying the left-to-right position of marker 31, through control of multivibrator 35, the thickness measurement can be made at various points across the width of the beam lead.

By varying the width of marker 31, through control of multivibrator 36, the thickness measurement can be made to apply to portions of varying width of the beam lead. For example, if marker 31 is made nearly as wide as the entire light strip portion 25a, then meter 44 will provide a reading which represents the average of the beam lead thickness. In contrast, if marker 31 is made much narrower than light strip portion 25a, the thickness measurement will apply to only a correspondingly narrow portion of the beam lead. Variations in thickness across the beam lead can then be discerned by traversing the marker 31 in a left-right direction along light strip portion 25a.

The individual elements which constitute the system of FIG. 2 are all entirely conventional, and need therefore not be described in further detail here.

Step charge circuits 42 and 43 may also take any conventional form, but are preferably of the form disclosed in U.S. Pat. application, Ser. No. 337,265, filed Mar. 1, 1973, in the names of Robert W. Hurlbrink, III and Liber J. Montone, and assigned to two assignees, one of which is also the assignee of the present invention.

Several additional aspects of the invention will now be highlighted.

In FIG. 1, the light-section microscope 10 is shown projecting light strip 15 upon a particular beam lead 11a of semiconductor chip 11. In order to measure the thickness of other beam leads of the same semiconductor chip, or of the beam leads of other chips on support 12, provisions are made to displace this support relative to the microscope, so as to bring any desired area into the microscope viewing field. This may be done either by displacing microscope 10, or, preferably, by displacing support 12 appropriately. Such displacement may be effected by any conventional means.

Camera 17, typically scans an entire field in one sixtieth of a second, and monitor 22, which scans in synchronism with the camera, likewise scans the entire screen 24 in the same time interval.

On the other hand, an interval of at least one second is customarily allowed for the taking of a thickness reading on differential meter 44. During this one-second period, there will be approximately sixty complete field scannings by both the camera and the monitor. This makes it possible to achieve an additional refinement in the accuracy of the thickness measurement. To this end, random deviations are permitted in the exact instant at which each field scan is initiated, rather than having these scans start with complete periodic regularity, as would be the case for example, if conventional two-to-one scanning interlace were used. Such random variations, in effect, produce random interlace of the horizontal scanning lines of the successive fields scanned during the meter reading interval. Such random interlace has the advantage that virtually the entire surface of the monitor camera viewing field and of the monitor screen will be scanned by individual scanning lines at some time during each series of 60 complete field scannings, rather than only those portions which happen to be defined by fixed interlace line scannings. More finely grained vertical resolution of the televised image results, and that, in turn, leads to more precise measurement of the difference in the distances by which the two markers 30 and 31 extend into their respective portions of image 15. Such increased precision results in greater accuracy of thickness measurement.

Random interlace can be accomplished in conventional manner by allowing the vertical synchronizing signal source to free-run at its nominal frequency. Its inherent instability will then provide the desired randomness.

Because multiple field scannings take place during the interval of, say, one second which is permitted for each thickness measurement, the voltages accumulated in step charge circuits 42 and 43 during each individual field scan must be averaged over these multiple field scans for presentation on differential meter 44. Such averaging can be provided by the inertia of the meter itself, or else by capacitor storage circuits having an adequately long time constant, interposed between the respective step charge circuit and the input of differential meter 44 to which it is connected.

It will also be understood that various modifications of the apparatus specifically described heretofore will occur to those skilled in the art, without departing from the inventive concept.

For example, it is not always necessary that a separate support 12 be provided to form the background against which to measure the thickness of beam lead 11a. If desired, the semiconductor chip 11, itself, may provide that support. To that end, the chip would be positioned so that the face on which the beam leads terminate can be illuminated by the light-section microscope. The light strip 15 projected by the microscope would then be caused to fall across the portion of the beam lead to be measured which overlaps the chip face. This alternative is particularly suitable when the semiconductor chip surface adjacent to the beam lead has adequate light reflectivity. This may be the case, at various stages in the processing of the chip as, for example, at those stages at which a coating of palladium or titanium forms the chip surface.

It is also not necessary that light-section microscope 10 use visible light. Ultraviolet or infrared light can also be used, as can virtually any form of beam-forming radiation, provided, of course, that camera 17 is sensitive to such radiation.

It is also not necessary for the two markers 30 and 31 to be of identical lengths, or identically positioned in the vertical direction.

If one of the markers is higher than the other, for example, this can be taken into account by recalibration of meter 44. However, it is preferred to have identical vertical marker positioning, for simplicity of system construction and operation.

Figure 3:
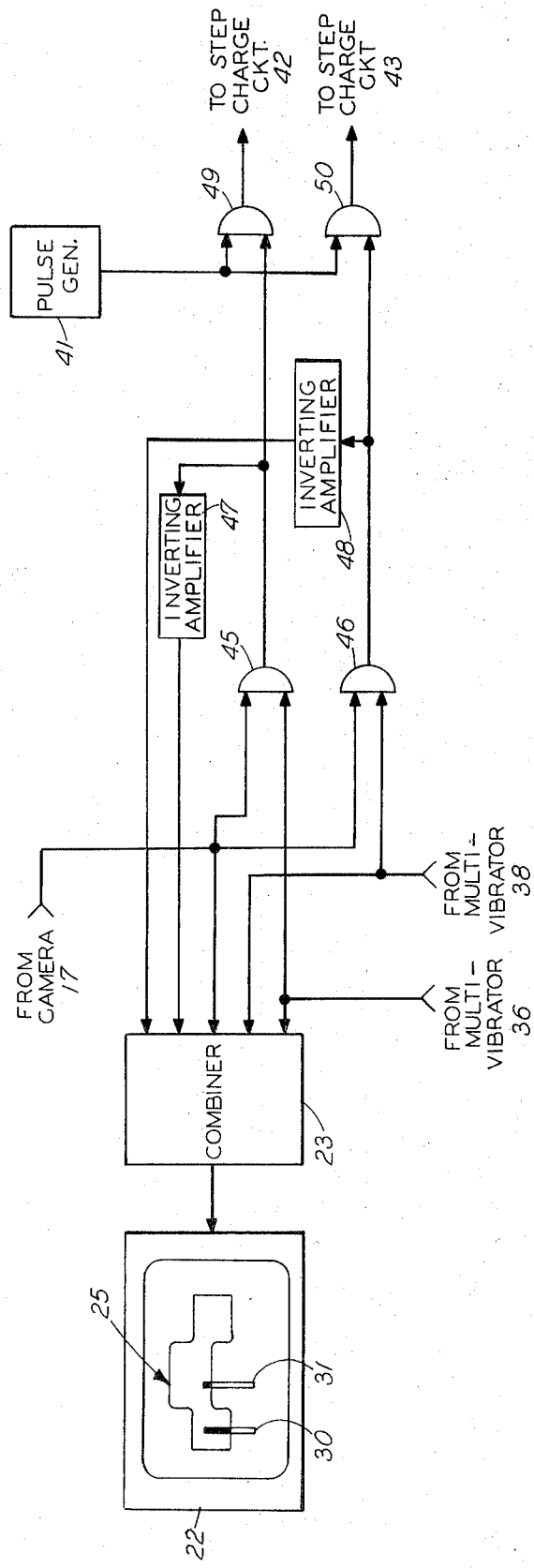
FIG. 3 shows those elements of another embodiment of the invention which differ from those illustrated in FIG. 2.

Another modification is shown in FIG. 3, to which reference may now be had. This modification is directed to the display of markers 30 and 31. It will be recalled that in FIG. 2 these markers are produced by signals whose polarities cause the markers to appear dark on monitor screen 24, while image 25 appears bright. For greater visual prominence, it is possible to produce the markers in such a way that they continue to be dark in those areas in which they overlap image 25, but change their appearance and become bright in those areas in which they do not overlap image 25.

To accomplish this, as shown in FIG. 3, the output signals from multivibrators 36 and 38 are applied to AND gates 45 and 46. The only other input to each of these AND gates is the video signal from camera 17. These gates therefore produce output signals when the respective markers and the image overlap. These output signals are polarity-inverted and suitably amplified in inverting amplifiers 47 and 48, respectively, whose outputs are supplied to combiner 23 for ultimate application to monitor 24, together with all of the other monitor display signals.

Among these other signals are marker representative signals coming directly from multivibrators 34 and 36. Assuming that these direct signals have polarities which cause bright marker images on monitor screen 24, then the signals applied from AND gates 45 and 46 will essentially cancel out these bright marker signals in those regions in which the markers overlap the light strip image. Moreover, by providing suitable amplification in inverting amplifiers 47 and 48, the output signals which they produce will also cancel out the camera video signals in the overlap regions. In this way, markers 30 and 31 will appear bright on screen 24 where they do not overlap the light strip image, while appearing dark where they do overlap.

In addition to being supplied to inverting amplifiers 47 and 48, the output signals from AND gates 45 and 46 are also supplied to AND gates 49 and 50. It is to these later AND gates 49 and 50 that the signals from pulse generator 41 are supplied, and it is at the outputs of gates 49 and 50 that signals corresponding to those present in FIG. 2 at the outputs of gates 39 and 40 are developed. These output signals from gates 49 and 50 are precessed further, in the same manner as the corresponding output signals in the embodiment of FIG. 2.

It will further be recognized that the invention is not limited in its application to the measurement of the thickness of semiconductor chip beam leads. Rather, the thickness of any object which lends itself to treatment as described above can be measured in accordance with the invention disclosed herein.

The invention is not even limited to the measurement of object thickness. For example, that aspect of the invention which resides in the use of markers, extending into different monitor image portions, to determine the displacement between these image positions is applicable even if the displacement in question does not form part of an object thickness measurement.

What is claimed is:

1. A method of measuring the thickness of an object, comprising the steps of:

producing video signals representing the scanning along a plurality of scanning lines of an image of said object and of a support for said object, the thickness of said object being represented by displacement between said object and support images;

producing additional signals representing the scanning of markers for said images extending over portions of adjacent ones of said scanning lines; and measuring the overlap between said video signals and said additional signals to determine said object thickness.

2. The method of measuring the thickness of an object, comprising the steps of:

projecting from a slanting direction a strip of light across said object and its support;

displaying on a television monitor an image of said light strip formed through line-by-line scanning of an area including said strip, said image having a first portion corresponding to said light strip projected across said object, and a second portion corresponding to said light strip projected across said support;

displaying on said monitor a pair of markers, positioned to respectively extend partly into said first and and second portions of said light strip image; and determining the distance by which each said marker extends into its respective image portion.

3. The method of claim 2, wherein said distance determining involves counting the number of said line scannings during which each said marker overlaps its respective image portion, and determining the difference between said numbers of overlapping line scannings thereby to determine the difference between said distances.

4. The method of claim 2, wherein said markers are produced with a brightness contrasting with that of said image where they extend into said image and with a brightness similar to that of said image where they do not extend into said image.

5. The method of claim 2 comprising the further step of:

displacing that one of said markers which extends into said first portion across the width of said first portion.

6. The method of claim 2 comprising the further step of varying the width of that one of said markers which extends into said first position.

7. An object thickness measuring system comprising:

means for producing video signals representing the scanning along a plurality of scanning lines of an image of said object and of a support for said object, the thickness of said object being represented by displacement between said object and support images;

means for producing additional signals representing the scanning of markers for said images extending over portions of adjacent ones of said scanning lines; and means for measuring the overlap between said video signals and said additional signals to determine said object thickness.

8. The system of claim 7, wherein said additional signal producing means is controllable so that some of said additional signals coincide with video signals representing scanning of said object image, others of said additional signals coincide with video signals representing scanning of said support image, and still others of said additional signals coincide neither with said object signals, nor with said support signals.

9. The system of claim 8, further comprising means for measuring the difference between said additional signals coinciding with said object signals and said additional signals coinciding with said support signals.

10. The system of claim 9, wherein said difference measuring means comprises means for subdividing each said coinciding signal into a plurality of signal pulses, and means for counting the number of said pulses.

11. The system of claim 7, wherein said video signal producing means comprises:

a light-section microscope for forming images of said support and of said object, and television camera means for scanning said microscope images, said system further comprising television monitor means supplied with said video signals for visually displaying said support and object images; and means for supplying to said monitor means said additional signals to also display said markers.

12. The system of claim 11, wherein said additional signal producing means comprises a chain of multivibrators controlled by the horizontal and vertical scanning synchronizing signals of said camera means.

13. The system of claim 12, wherein said chain comprises a first pair of multivibrators supplied with said vertical synchronizing signals, said system further comprising an AND gate supplied with the output of said first pair of multivibrators and with said horizontal synchronizing signals, and means for supplying the output of said AND gate to second and third pairs of multivibrators in said chain, the outputs of said second and third pairs of multivibrators respectively representing said markers.

14. Apparatus for determining the relative displacement of different portions of a television image, comprising:

means for generating signals representing markers for said image portions;

means for controlling said generating means to position said markers to respectively extend partly into said different portions; and means for determining the difference between the distances by which said markers extend into said different portions.

15. The apparatus of claim 14, wherein said generating means includes means for producing two sets of signals, one set extending over corresponding portions of adjacent image scanning lines, and the other extending over different corresponding portions of said adjacent image scanning lines, whereby said markers occupy the same positions in a direction transverse to said scanning lines, and wherein said difference determining means includes means for counting the number of said scanning line portions in each said set of signals which coincide with line scannings of the respective image portions whose relative displacement is to be measured.

* * * * *